(12) United States Patent
Sugiyama

(10) Patent No.: US 6,845,128 B2
(45) Date of Patent: Jan. 18, 2005

(54) VIDEO-EMPHASIS ENCODING APPARATUS AND DECODING APPARATUS AND METHOD OF VIDEO-EMPHASIS ENCODING AND DECODING

(75) Inventor: Kenji Sugiyama, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 513 days.

(21) Appl. No.: 10/067,815

(22) Filed: Feb. 8, 2002

(65) Prior Publication Data

US 2002/0110191 A1 Aug. 15, 2002

(30) Foreign Application Priority Data

Feb. 9, 2001 (JP) ........................................ 2001-033401
Feb. 9, 2001 (JP) ........................................ 2001-033403

(51) Int. Cl.[7] .............................................. H04B 1/66
(52) U.S. Cl. ................................................ 375/240.01
(58) Field of Search ....................... 375/240.01, 240.03, 375/240.13, 240.14; 382/199; H04B 1/66

(56) References Cited

U.S. PATENT DOCUMENTS 5,315,326 A * 5/1994 Sugiyama ............... 375/240.12
5,880,785 A * 3/1999 Fujiwara ................. 375/240.18
2001/0033691 A1 * 10/2001 Kimura ....................... 382/199

* cited by examiner

Primary Examiner—Tung Vo
(74) Attorney, Agent, or Firm—Jacobson Holman PLLC

(57) ABSTRACT

An emphasis processing is applied to an input video signal to obtain a video bitstream. An emphasis level is set to the input video signal in accordance with at least one factor among control data carried by the input video signal, a picture state detected from the input video signal and encoding conditions for the input video signal. The emphasis processing is applied to the input video signal at the emphasis level to obtain a emphasized video signal. The emphasized video signal is encoded to obtain a video bitstream. The video bitstream is multiplexed with data on the emphasis level. A video bitstream is decoded and applied a deemphasis processing. A deemphasis level is set that matches an emphasis level obtained from emphasis-level data carried by the video bitstream to which an input video signal has been encoded and emphasized at the emphasis level. The video bitstream is decoded for reproducing the video signal. The deemphasis processing is applied to the reproduced video signal at the deemphasis level to obtain a deemphasized video signal.

8 Claims, 3 Drawing Sheets

VIDEO-EMPHASIS ENCODING APPARATUS AND DECODING APPARATUS AND METHOD OF VIDEO-EMPHASIS ENCODING AND DECODING

BACKGROUND OF THE INVENTION

The present invention relates to a video-emphasis encoding apparatus and a method of video-emphasis encoding for applying an emphasis processing to input video signals and encoding the emphasized signals to obtain video bitstreams. Moreover, this invention relates to a video-emphasis decoding apparatus and a method of video-emphasis decoding for decoding the video bitstreams.

[Emphasis and Encoding]

An emphasis processing is a known technique widely used in storage and transfer of video and audio signals. In detail, an emphasis circuit gives emphasis effects on high-frequency components of video or audio signals before storage and transfer.

The emphasized high-frequency components are eliminated by a deemphasis circuit after storage and transfer for regaining the frequency characteristics which the video or audio signals have exhibited before transferred. Noises and aliasing generated during storage or transfer can be attenuated only by a deemphasis processing.

The emphasis processing could cause an overrange condition on high-frequency component-emphasized video or audio signals against signal storage and transfer.

The emphasis processing is, however, useful in highly-efficient encoding processing such as discrete cosine transform (DCT), for less block distortion and mosquito noises which may otherwise be generated during encoding and decoding. This processing may not achieve high coding efficiency due to large quantization errors which will be produced at a fixed amount of codes to be generated for emphasized high-frequency components that generate a large amount of data. Nevertheless, the emphasis processing eliminates block noises because this processing is applied over blocks, different from DCT-encoding and decoding.

Adaptive filtering for eliminating noises and distortion on decoded pictures (post processing) may not be efficient because signal components could also be filtered during noises/aliasing elimination.

In MPEG-Audio standards for audio encoding, a bitstream is multiplexed with a flag that indicates whether an encoded signal has been applied the emphasis processing. The encoded signal is then applied the deemphasis processing after decoded when it carries a flag indicating the emphasis.

[Enhancement]

An enhancement processing is similar to the emphasis processing but for different purpose, only applied to video signals in general. In detail, the enhancement processing compensates reproduced pictures for detail sections which will be hard to watch from a remote place due to the visual spatial frequency characteristics of human.

The enhancement processing is similar to the emphasis processing because it enhances high-frequency components of video signals. This processing is usually performed at TV cameras and TV sets. The enhancement processing requires no reverse correction, thus having no processing like the deemphasis processing.

[Video-Emphasis Encoding Apparatus]

In a known video-emphasis encoding apparatus, an input video signal is subjected to spatial high-pass filtering for extracting high-frequency (HF) components. The extracted HF components are added to the input video signal to produce a HF-component-emphasized signal in accordance with emphasis data indicating an emphasis processing. The emphasis processing is disclosed, for example, in Japanese Un-examined Patent Publication No. 7-162862. The emphasized signal is subjected to a known predictive-encoding processing to produce a variable-length bitstream. The bitstream is multiplexed with the emphasis data. The multiplexed bitstream is then output for storage or transfer.

[Video-Deemphasis Decoding Apparatus]

In a known video-deemphasis decoding apparatus compatible with the video-emphasis encoding apparatus described above, the emphasis data is separated from the multiplexed bitstream. The remaining bitstream is subjected to a known decoding processing to reproduce a predictive error that has been produced by the predictive encoding. The reproduced predictive error is subjected to spatial high-pass filtering for extracting high-frequency (HF) components of the original video signal. The HF components are subtracted from the predictive error in accordance with the emphasis data, thus reproduce the original video signal having the frequency characteristics identical to that before the emphasis processing applied.

Such known video-emphasis encoding apparatus, however, has the following drawbacks:

The emphasis processing is applied to video signals with no emphasis-level control. The emphasis data transferred to the video-deemphasis decoding apparatus indicates only whether or not the emphasis processing has been applied to video signals.

An overrange condition thus often occurs to input video signals when the video signals have already been applied the enhancement processing.

Narrow quantization step width for quantization of the input video signals in video-emphasis encoding often causes increase in codes generated against noise elimination.

Moreover, videos signals reproduced by the video-deemphasis decoding apparatus are sometimes unsuitable for the enhancement processing at a display apparatus for displaying the reproduced video signals.

SUMMARY OF THE INVENTION

A purpose of the present invention is to provide a video-emphasis encoding apparatus and a method of video-emphasis encoding for achieving high image quality to reproduced pictures with less occurrence of an overrange condition and less generation of codes which may otherwise often occur and increase due to emphasis processing.

Another purpose of the present invention is to provide a video-deemphasis decoding apparatus and a method of video-deemphasis decoding for achieving high image quality to reproduced pictures suitable for the enhancement processing at a display apparatus for displaying the reproduced video signals.

The present invention provides a video-emphasis encoding apparatus for applying an emphasis processing to an input video signal to obtain a video bitstream comprising: an emphasis-level setter for setting an emphasis level to the input video signal in accordance with at least one factor among control data carried by the input video signal, a picture state detected from the input video signal and encoding conditions for the input video signal; an emphasizer for applying the emphasis processing to the input video signal at the emphasis level to obtain an emphasized video signal; an encoder for encoding the emphasized video signal to obtain a video bitstream; and a multiplexer for multiplexing the video bitstream and data on the emphasis level.

Moreover, the present invention provides a method of video-emphasis encoding for applying an emphasis processing to an input video signal to obtain a video bitstream comprising the steps of: setting an emphasis level to the input video signal in accordance with at least one factor among control data carried by the input video signal, a picture state detected from the input video signal and encoding conditions for the input video signal; applying the emphasis processing to the input video signal at the emphasis level to obtain a emphasized video signal; encoding the emphasized video signal to obtain a video bitstream; and multiplexing the video bitstream and data on the emphasis level.

Furthermore, the present invention provides a video-deemphasis decoding apparatus for decoding and applying a deemphasis processing to an input video bitstream comprising: a deemphasis-level setter for setting a deemphasis level that matches an emphasis level obtained from emphasis-level data carried by the video bitstream to which an input video signal has been encoded and emphasized at the emphasis level; a decoder for decoding the input video bitstream for reproducing the video signal; and a deemphasizer for applying the deemphasis processing to the reproduced video signal at the deemphasis level to obtain a deemphasized video signal.

Still furthermore, the present invention provides a video-deemphasis decoding method for decoding and applying a deemphasis processing to an input video bitstream comprising the steps of: setting a deemphasis level that matches an emphasis level obtained from emphasis-level data carried by the video bitstream to which an input video signal has been encoded and emphasized at the emphasis level; decoding the input video bitstream for reproducing the video signal; and applying the deemphasis processing to the reproduced video signal at the deemphasis level to obtain a deemphasized video signal.

DETAILED DESCRIPTION OF PREFERRED EMBODIMENTS

Preferred embodiments according to the present invention will be disclosed with reference to the attached drawings.

One of the features of the present invention lies in emphasis-level settings in accordance with quantization parameters for encoding of input video signals in the first embodiment of a video-emphasis encoding apparatus. In detail, the emphasis-level settings are performed as the wider the quantization step width, the higher the emphasis level for less generation of block distortion and mosquito noises whereas the narrower the quantization step width, the lower the emphasis level for less generation of codes and also less occurrence of an overrange condition.

Another feature of the present invention lies in emphasis-level settings in accordance with the level of enhancement processing already applied to input video signals in the second embodiment of a video-emphasis encoding apparatus. In detail, the emphasis-level settings are performed as the higher the enhancement level, the lower the emphasis level for less occurrence of an overrange condition. The emphasis processing restricts the generation of block distortion and mosquito noises.

Still another feature of the present invention lies in deemphasis-level settings based on data on emphasis level (with quantization data) multiplexed to input video signals in the first embodiment of a video-deemphasis decoding apparatus, for reproducing pictures of initial frequency characteristics.

A further feature of the present invention lies in deemphasis-level settings for decoded pictures in accordance with enhancement levels at a display apparatus for displaying reproduced pictures in the second embodiment of a video-deemphasis decoding apparatus. The deemphasis-level settings are performed as the lower the enhancement level at the display apparatus, the lower the deemphasis level for reproducing pictures at an adequate enhancement level.

[First Embodiment of Video-Emphasis Encoding Apparatus]

Figure 1:
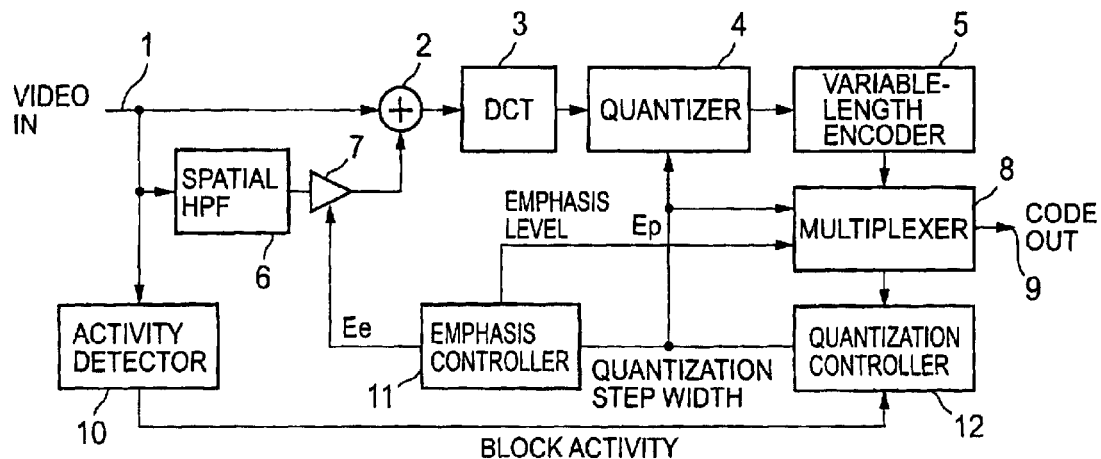
FIG. 1 shows a block diagram of a first embodiment of a video-emphasis encoding apparatus according to the present invention.

Disclosed first in detail with reference to FIG. 1 is the first embodiment of a video-emphasis encoding apparatus according to the present invention.

In FIG. 1, an input video signal is supplied to an adder 2, a spatial high-pass filter (HPF) 6, and an activity detector 10 (which will be explained later) via a video-input terminal 1.

Figures 5, 6:
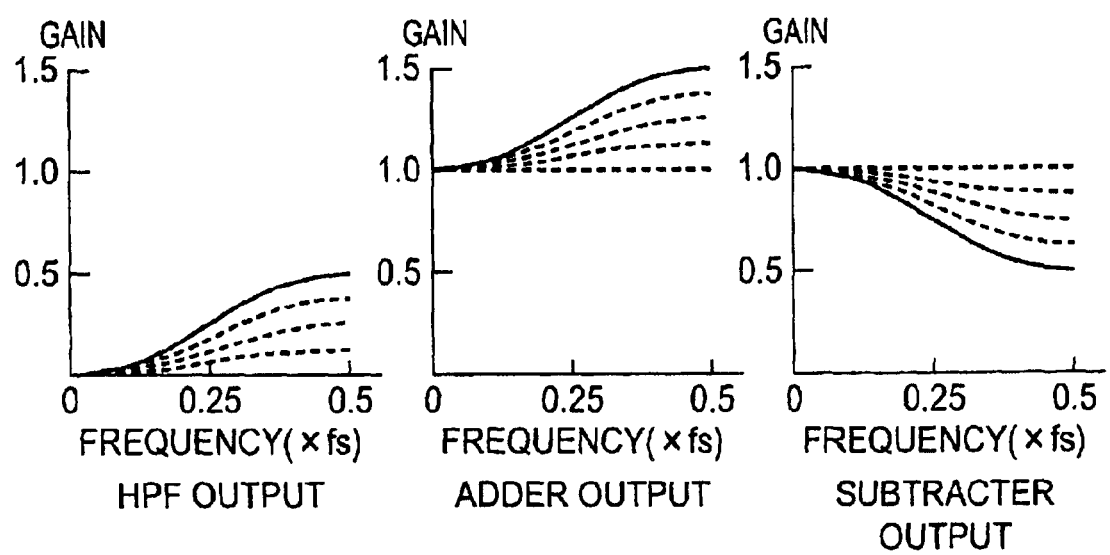
FIG. 5 illustrates two-dimensional filter coefficients, an example for the spatial high-pass filter (HPF) shown in FIGS. 1 and 3.
FIG. 6 shows one-dimensional frequency characteristics for the spatial HPF shown in FIGS. 1 and 3.

A high-frequency component only is extracted from the input video signal by the spatial HPF 6. FIG. 5 illustrates two-dimensional filter coefficients, an example for the spatial HPF 6. The vertical or horizontal one-dimensional spatial frequency characteristics for the spatial HPF 6 is shown in FIG. 6 (HPF OUTPUT). The gain is zero for DC components of the input video signal. The higher the frequency of the input video signal, the higher the gain, particularly, 0.5 at the maximum frequency.

The high-frequency component of the video signal is supplied to a multiplier 7 for multiplication with an emphasis value Ee (0 to 1.0) supplied from an emphasis controller 11, which will be explained later. The high-frequency component multiplied by the emphasis value Ee is supplied to an adder 2. The Ee-multiplied high-frequency component is added to the input video signal for high-frequency component emphasis processing.

The adder 2 also applies a delay-compensation processing to the added video signal to compensate for a delay caused to the high-frequency component, which have occurred through the spatial HPF 6 and the multiplier 7. The frequency characteristics of the high-frequency component-added video signal is shown in FIG. 6 (ADDER OUTPUT). The frequency characteristics is almost flat at zero for the emphasis value Ee. The maximum frequency is multiplied by 1.5 at 1.0 for the emphasis value Ee.

The video signal for which the high-frequency component has been emphasized through addition at the adder 2 is supplied to a DCT (discrete cosign transform) 3 for an (8×8)-DCT conversion processing. The resultant DCT coefficients are supplied to a quantizer 4. The DCT coefficients are quantized at a specific step width to become fixed-length codes. The fixed-length codes of the DCT coefficients are supplied to a variable-length encoder 5 for compression with variable-length codes. The resultant video bitstream is supplied to a multiplexer 8.

The multiplexer 8 multiplexes the video bitstream with quantization step-width data and data of a specific emphasis level Ep (both data constituting emphasis-level data), which will be explained later. The multiplexed video bitstream is output via a code-output terminal 9.

The multiplexer 8 then supplies code-amount data on the bitstream generated through the multiplex processing to a quantization controller 12. The quantization controller 12 sets a quantization step width based on the code-amount data and block activity (explained later) supplied from the activity detector 10. The set quantization step-width data is supplied to the quantizer 4, the multiplexer 8 and also the emphasis controller 11 which will be explained later.

The quantization controller 12 adjusts the quantization step width as the larger the generated codes of bitstream and/or the higher the block activity, the wider the quantization step width for coarse quantization whereas the smaller the generated codes and/or the lower the block activity, the narrower the quantization step width for fine quantization.

The activity detector 10 and the emphasis controller 11 will be described in detail.

The activity detector 10 divides each (16×16)-pixel block of the input video signal into four sub-blocks. The (16×16)-pixel block is a block unit for quantization step-width settings. The activity detector 10 then obtains a dispersion value for pixel values in each sub-block. The minimum dispersion value among dispersion values for the four sub-blocks is supplied to the quantization controller 12 as the block activity for each (16×16)-pixel block.

The emphasis controller 11 sets an emphasis level (the emphasis value Ee) based on a preset emphasis level Ep (0 to 1) and the quantization step width. In detail, the quantization step width is normalized (divided) by a quantization step width which is one-half of the maximum quantization step width. The normalized quantization step width is rounded to 1 when it is 1 or more. Thus the normalized quantization step width QS is in the range from 0 to 1. The emphasis level Ee is then obtained as Ee=Ep×QS. The narrower the quantization step width, the lower the emphasis level for quantization at a quantization step width narrower than one-half of the maximum quantization step width. The preset emphasis level Ep (0 to 1) is supplied to the multiplexer 8 as a part of the emphasis level data.

[First Embodiment of Video-Deemphasis Decoding Apparatus]

Figure 2:
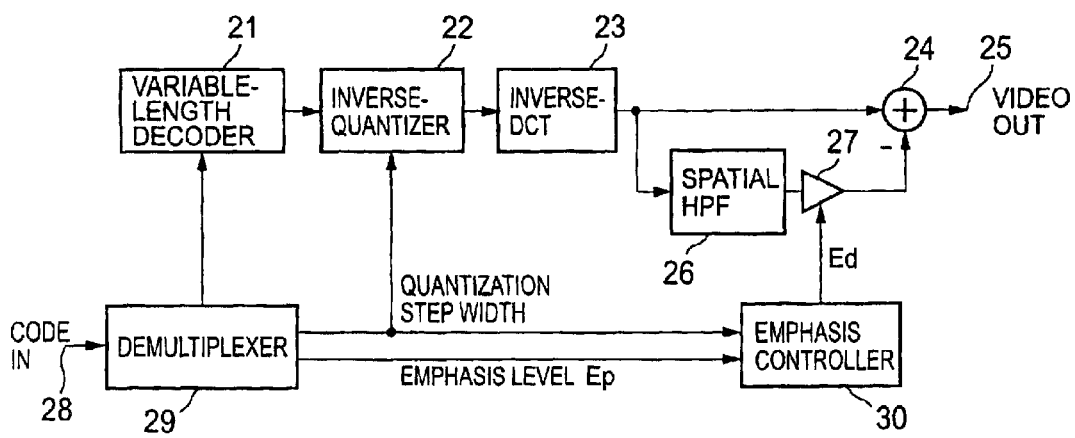
FIG. 2 shows a block diagram of a first embodiment of a video-deemphasis decoding apparatus according to the present invention, that is compatible with the video-emphasis encoding apparatus shown in FIG. 1.

Disclosed next with reference to FIG. 2 is the first embodiment of a video-deemphasis decoding apparatus according to the present invention, that is compatible with the video-emphasis encoding apparatus (first embodiment) shown in FIG. 1.

In FIG. 2, a video bitstream carrying emphasis level data (emphasis level Ep and normalized quantization step width) discussed above is supplied to a demultiplexer 29 via a code input terminal 28.

The data on emphasis level Ep (0 to 1) and quantization step width are separated from the video bitstream. The video bitstream is supplied to a variable-length decoder 21. The emphasis level (Ep) data is supplied to an emphasis controller 30. The quantization step-width data is supplied to an inverse-quantizer 22 and the emphasis controller 30.

Variable-length codes of the video bitstream are reconverted into fixed-length codes by the variable-length decoder 21. The fixed-length codes are supplied to an inverse-quantizer 22 for reproduction of (8×8)-DCT coefficients of predictive errors. The (8×8) number of DCT coefficients are converted for reproduction of a predictive-error signal.

The reproduced predictive-error signal is supplied to a subtracter 24 and a spatial HPF 26. Only a high-frequency component of the predictive-error signal is extracted by the spatial HPF 26 and supplied to a multiplier 27 for multiplication with a deemphasis value Ed (0 to 1) supplied from an emphasis controller 30, which will be explained later. The high-frequency component multiplied by the deemphasis value Ed is supplied to the multiplier 27. The Ed-multiplied high-frequency component is subtracted from a decoded video signal (predictive-error signal) at the subtracter 24 for reproducing a video signal having the frequency characteristics (SUBTRACTER OUTPUT in FIG. 6) identical to that before an emphasis processing has been applied. The reproduced video signal is output via a video output terminal 25. The frequency characteristics SUBTRACTER OUTPUT is obtained by a filtering processing of the spatial HPF 26, the multiplier 27 and the subtracter 24. The frequency characteristics SUBTRACTER OUTPUT is the inverse of the frequency characteristics ADDER OUTPUT (FIG. 6) obtained by the adder 2 (FIG. 1). A series of emphasis and deemphasis processing gives a flat frequency characteristics to the reproduced pictures.

Based on the emphasis level Ep (0 to 1) and normalized quantization step width data supplied from the demultiplexer 29, the emphasis controller 30 sets a deemphasis value Ed which is then supplied to the multiplier 27.

As already disclosed, the quantization step width has been normalized by a quantization step width, one-half of the maximum quantization step width, during encoding. The normalized quantization step width has been rounded to 1 when it was 1 or more. Thus the normalized quantization step width QS has been in the range from 0 to 1. The deemphasis value Ed is then obtained as Ed=Ep×QS.

[Second Embodiment of Video-Emphasis Encoding Apparatus]

Figure 3:
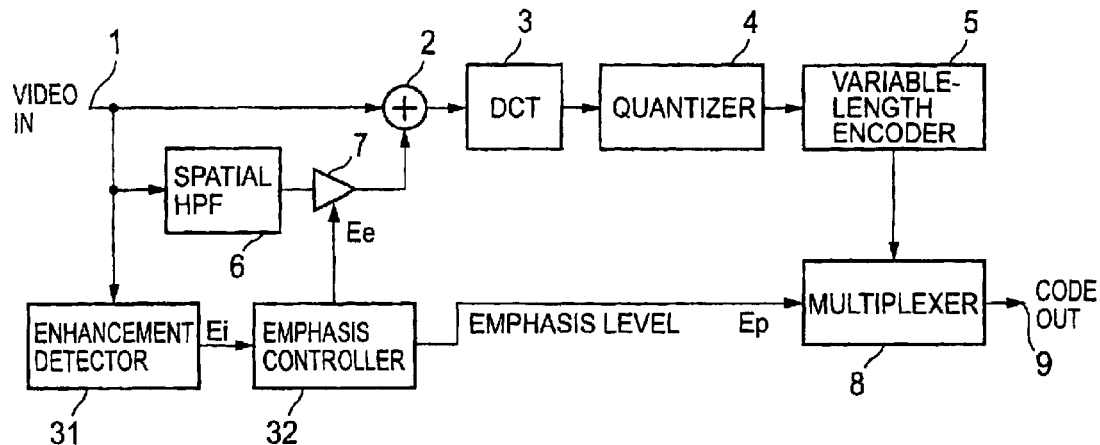
FIG. 3 shows a block diagram of a second embodiment of a video-emphasis encoding apparatus according to the present invention.

Disclosed next with reference to FIG. 3 is the second embodiment of a video-emphasis encoding apparatus according to the present invention.

Elements in this embodiment that are the same as or analogous to elements in the first embodiment (FIG. 1) are referenced by the same reference numbers.

Different from the first embodiment, the second embodiment of a video-emphasis encoding apparatus has an enhancement detector 31 instead of the activity detector 10 and the quantization controller 12 (both shown in FIG. 1). The second embodiment also has an emphasis controller 32, but it will work differently from the counterpart 11 shown in FIG. 1.

In the second embodiment, a video input terminal 1, an adder 2, a DCT 3, a quantizer 4, a variable-length encoder 5, a spatial high-pass filter (HPF) 6, a multiplier 7, a multiplexer 8 and a code output terminal 9 are equivalent to the counterparts of the first embodiment (FIG. 1), and hence will not be disclosed for brevity.

Data multiplex in emphasis-level control in the second embodiment is also basically the same as in the first embodiment, and hence will not be disclosed for brevity.

A feature of the second embodiment lies in emphasis-level control which is different from the first embodiment, and hence the disclosure will focus on the emphasis-level control.

In FIG. 3, an input video signal is supplied to the enhancement detector 31 for detection of the level of enhancement applied to the input video signal, as follows:

Medium-frequency components (0.125 fs to 0.25 fs) and high-frequency components (0.25 fs to 0.5 fs) are extracted from the input video signal by band-pass filtering.

A one-frame average value is obtained as Sm for the medium-frequency components. In detail, the one-frame average value Sm is obtained by frame integration of the absolute values of the extracted medium-frequency components. The same is obtained as Sh for the high-frequency components.

A ratio Sr of the high-frequency components to the medium-frequency components for one-frame average value is obtained as Sr=Sh/Sm. The ratio Sr is then compared with a predetermined average value Ss under no enhancement processing, as Se=Sr/Ss.

An estimated enhancement level Ei is then obtained as E=2(Se−1) in which Ei is rounded to 0 when the resultant level is 0 or less whereas to 1 when 1 or more. This Ei is an estimated value and which becomes more accurate when obtained as Ei(n)=0.1Ei(n)+0.9Ei(n−1), "n" being a frame number, as an average between succeeding two frames.

The estimated enhancement level Ei (0 to 1) is supplied to the emphasis controller 32. Based on the estimated enhancement level Ei and a predetermine deemphasis level Ep (0 to 1), the emphasis controller 32 sets an emphasis level Ee as Ee=Ep−E1 in which Ee is rounded to 0 when the resultant level is 0 or less.

The emphasis level Ee can be obtained as Ee=(Ep−E1)× QS in combination of the first and the second embodiments of the video-emphasis encoding apparatus. A quantization value QS is obtained by linear conversion as it is 0 at the minimum quantization step width whereas 1 at a quantization step width that is one-half or more of the maximum quantization step width.

Enhancement effects applied to the input video signal before encoding will be cancelled at the video-deemphasis decoding apparatus when the predetermineddeemphasis level (0 to 1) is multiplexed to a video bitstream at the multiplexer 8 as emphasis level data. On the other hand, such pre-enhancement effects will remain on pictures reproduced at the video-deemphasis decoding apparatus when the emphasis level Ee is multiplexed to a video bitstream instead of the predetermineddeemphasis level Ep.

[Second Embodiment of Video-Deemphasis Decoding Apparatus]

Figure 4:
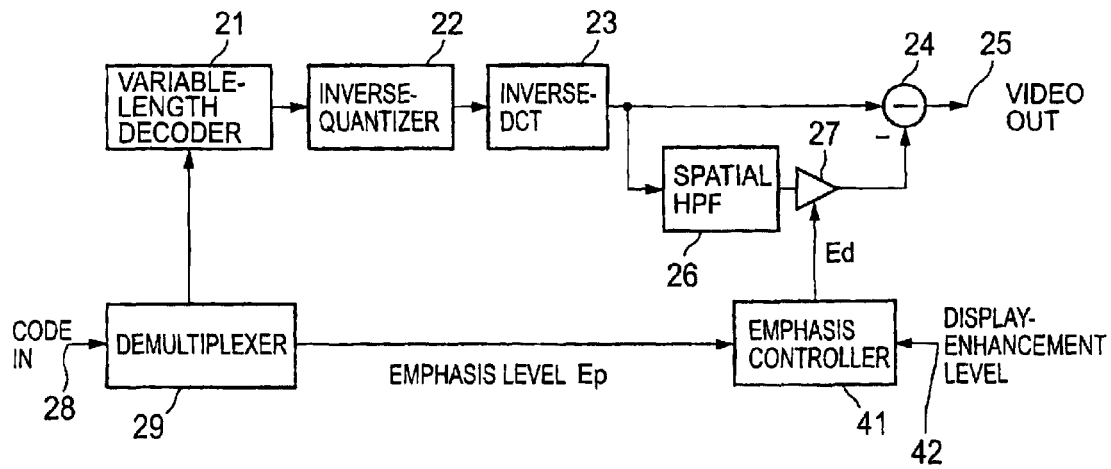
FIG. 4 shows a block diagram of a second embodiment of a video-deemphasis decoding apparatus according to the present invention, that is compatible with the video-emphasis encoding apparatus shown in FIG. 3.

Disclosed next with reference to FIG. 4 is the second embodiment of a video-deemphasis decoding apparatus according to the present invention, that is compatible with the video-emphasis encoding apparatus (second embodiment) shown in FIG. 3.

Elements in this embodiment that are the same as or analogous to elements in the first embodiment (FIG. 2) are referenced by the same reference numbers.

The second embodiment has an emphasis controller 41 that receives display-enhancement-level data via a terminal 42, thus working differently from the counterpart 30 (FIG. 2).

In the second embodiment, a code input terminal 28, a demultiplexer 29, a variable-length decoder 21, an inverse-quantizer 22, an inverse-DCT 23, a spatial high-pass filter (HPF) 26, a multiplier 27, a subtracter 24 and a video output terminal 25 are equivalent to the counterparts of the first embodiment (FIG. 2), and hence will not be disclosed for brevity.

A feature of the second embodiment lies in deemphasis-level adjustments in that a deemphasis level is lowered in decoding when a monitor has a low enhancement-effect performance on pictures to be displayed, for reproducing pictures having emphasized high-frequency components.

The emphasis controller 41 sets a deemphasis level Ed based on the predetermineddeemphasis level Ep (0 to 1), discussed in the second embodiment of the video-emphasis encoding apparatus, supplied from the demultiplexer 29 and a display-enhancement level E0 (0 to 1) supplied via the terminal 42. The deemphasis level Ed is obtained as Ed=Ep+ E0−1 in which Ed is rounded to 0 when the resultant level is 0 or less.

The display-enhancement level E0 is adjusted to 0 for no enhancement effects whereas 1 for the maximum enhancement effects. The level E0 will be adjusted at the monitor for all-in-one unit that has both a video-deemphasis decoding apparatus and a monitor, if not, it will be adjusted in accordance with a type of monitor to be connected to a video-deemphasis decoding apparatus.

In detail, the display-enhancement level E0 is adjusted, for example, to 0 for PC monitors having no enhancement functions, and 0.5 for TV sets having no image quality-adjustment functions with low enhancement effects whereas 1 for TV sets having image quality-adjustment functions with high enhancement effects.

Emphasis-level settings by the emphasis controller at the video-emphasis decoder may be done in accordance with at least one of the following three factors:

control data such as emphasis-level designating data carried by input video signals (not disclosed in the foregoing embodiments);

picture state such as the degree of enhancement effects on input video signals, which can be detected from the input video signals; and encoding conditions for the input video signals such as the degree of quantization applied to the video signals in encoding.

As disclosed above, the video-emphasis encoding apparatus and the video-deemphasis decoding apparatus according to the present invention have the following advantages:

(a) Emphasis-level settings in accordance with at least one of three factors such as control data carried by input video signals, picture state detected from the input video signals and encoding conditions for the input video signals provide high image quality after decoding and reproduction while restricting occurrence of an overrange condition and increase in generated code amounts in emphasis processing.

(b) High-level emphasis processing to video signals quantized at a wide quantization step width (a degree of quantization detected as video-signal encoding conditions) provides pictures with less block distortion and mosquito noises. On the contrary, low-level emphasis processing to video signals quantized at a narrow quantization step width (another degree of quantization detected as video-signal encoding conditions) provides pictures with restricted overrange condition and code amounts in emphasis processing.

(c) Low-level emphasis processing to video signals at high-enhancement levels (detected from the video signals) provides pictures with restricted overrange condition and code amounts in emphasis processing and also less block distortion and mosquito noises.

What is claimed is:

1. A video-emphasis encoding apparatus for applying an emphasis processing to an input video signal to obtain a video bitstream comprising:

an emphasis-level setter for setting an emphasis level to the input video signal in accordance with at least one factor among control data carried by the input video signal, a picture state detected from the input video signal and encoding conditions for the input video signal;

an emphasizer for applying the emphasis processing to the input video signal at the emphasis level to obtain an emphasized video signal;

an encoder for encoding the emphasized video signal to obtain a video bitstream; and a multiplexer for multiplexing the video bitstream and data on the emphasis level.

2. The video-emphasis encoding apparatus according to claim 1 further comprising a detector for detecting a degree of quantization applied to the input video signal, wherein the emphasis-level setter sets the emphasis level in accordance with the detected degree of quantization as the encoding conditions.

3. The video-emphasis encoding apparatus according to claim 1 further comprising a detector for detecting a degree of enhancement effects already applied to the input video signal, wherein the emphasis-level setter sets the emphasis level in accordance with the detected degree of enhancement effects as the picture state detected from the input video signal.

4. A method of video-emphasis encoding for applying an emphasis processing to an input video signal to obtain a video bitstream comprising the steps of:

setting an emphasis level to the input video signal in accordance with at least one factor among control data carried by the input video signal, a picture state detected from the input video signal and encoding conditions for the input video signal;

applying the emphasis processing to the input video signal at the emphasis level to obtain a emphasized video signal;

encoding the emphasized video signal to obtain a video bitstream; and multiplexing the video bitstream and data on the emphasis level.

5. A video-deemphasis decoding apparatus for decoding and applying a deemphasis processing to an input video bitstream comprising:

a deemphasis-level setter for setting a deemphasis level that matches an emphasis level obtained from emphasis-level data carried by the video bitstream to which an input video signal has been encoded and emphasized at the emphasis level;

a decoder for decoding the input video bitstream for reproducing the video signal; and a deemphasizer for applying the deemphasis processing to the reproduced video signal at the deemphasis level to obtain a deemphasized video signal.

6. The video-deemphasis decoding apparatus according to claim 5, wherein the deemphasis-level setter obtains data including a degree of quantization applied to the input video signal as the emphasis-level data to obtain the emphasis level in accordance with the degree of quantization, thus setting the deemphasis level that matches the emphasis level.

7. The video-deemphasis decoding apparatus according to claim 5 further comprising means for obtaining data on a degree of enhancement effects to be applied to the reproduced video signal at a display apparatus, wherein the deemphasis-level setter sets the deemphasis level in accordance with the emphasis-level data and the degree of enhancement effects.

8. A video-deemphasis decoding method for decoding and applying a deemphasis processing to an input video bitstream comprising the steps of:

setting a deemphasis level that matches an emphasis level obtained from emphasis-level data carried by the video bitstream to which an input video signal has been encoded and emphasized at the emphasis level;

decoding the input video bitstream for reproducing the video signal; and applying the deemphasis processing to the reproduced video signal at the deemphasis level to obtain a deemphasized video signal.

* * * * *